United States Patent
Feder et al.

(10) Patent No.: US 8,230,212 B2
(45) Date of Patent: Jul. 24, 2012

(54) METHOD OF INDEXING SECURITY KEYS FOR MOBILE INTERNET PROTOCOL AUTHENTICATION

(75) Inventors: Peretz M. Feder, Englewood, NJ (US); Semyon B. Mizikovsky, Morganville, NJ (US)

(73) Assignee: Alcatel Lucent, Paris (FR)

( * ) Notice: Subject to any disclaimer, the term of this patent is extended or adjusted under 35 U.S.C. 154(b) by 1214 days.

(21) Appl. No.: 11/740,152

(22) Filed: Apr. 25, 2007

(65) Prior Publication Data

US 2008/0059792 A1    Mar. 6, 2008

Related U.S. Application Data

(60) Provisional application No. 60/840,760, filed on Aug. 29, 2006.

(51) Int. Cl.
*H04L 29/06* (2006.01)
(52) U.S. Cl. ........ 713/155; 455/410; 455/411; 380/247; 380/270
(58) Field of Classification Search .................. 713/155; 726/14; 455/411, 435.1; 380/247, 270, 273, 380/278, 279
See application file for complete search history.

(56) References Cited

U.S. PATENT DOCUMENTS

| | | | |
|---|---|---|---|
| 6,327,660 B1 * | 12/2001 | Patel .............................. | 713/193 |
| 7,289,504 B1 * | 10/2007 | Hippelainen et al. .......... | 370/392 |
| 7,409,549 B1 * | 8/2008 | Leung et al. ................... | 713/168 |
| 2003/0220107 A1 * | 11/2003 | Lioy et al. .................... | 455/435.1 |
| 2005/0190734 A1 * | 9/2005 | Khalil et al. ................... | 370/338 |
| 2006/0130136 A1 * | 6/2006 | Devarapalli et al. ............ | 726/15 |
| 2007/0091843 A1 * | 4/2007 | Patel et al. ..................... | 370/331 |
| 2007/0124592 A1 * | 5/2007 | Oyama .......................... | 713/171 |
| 2007/0170252 A1 * | 7/2007 | Orton ............................ | 235/386 |

* cited by examiner

*Primary Examiner* — Vivek Srivastava
*Assistant Examiner* — Thomas Lauzon
(74) *Attorney, Agent, or Firm* — Williams, Morgan & Amerson, P.C.

(57) ABSTRACT

The present invention provides a method involving a mobile node, a home agent, and an authentication server in a wireless communication system. The method includes generating, at the authentication server, a first security key that indicates a secure association between the home agent and the mobile node based on a second security key that indicates a secure association between the mobile node and the authentication server. The method also includes generating, at the authentication server, at least one first index associated with the first security key. The first index is also generated by the mobile node. The method also includes storing, at the authentication server, the first index and the first security key.

22 Claims, 8 Drawing Sheets

METHOD OF INDEXING SECURITY KEYS FOR MOBILE INTERNET PROTOCOL AUTHENTICATION

CROSS REFERENCE TO RELATED APPLICATIONS

This application claims priority to U.S. Provisional Patent Application 60/840,760, filed on Aug. 29, 2006.

BACKGROUND OF THE INVENTION

1. Field of the Invention

This invention relates generally to communication systems, and, more particularly, to wireless communication systems.

2. Description of the Related Art

The coverage area of a wireless communication system is typically divided into a number of geographic areas that are often referred to as cells. Mobile units located in each cell may access the wireless communications system by establishing a wireless communication link, often referred to as an air interface, with a base station or access network associated with the cell. The mobile units may include devices such as mobile telephones, personal data assistants, smart phones, Global Positioning System devices, wireless network interface cards, desktop or laptop computers, and the like. Mobile units may also be referred to as mobile nodes. Communication between the mobile unit and the access network may be authenticated and/or secured using one or more authentication protocols.

A mobile node that has an established security association with a first access network may roam to another cell served by a second access network. In mobile networks such as WiMAX networks or CDMA2000® High Rate Packet Data (HRPD) networks defined by the Third Generation Partnership Project (3GPP, 3GPP2) active sessions are transferred from one access network to another by conducting Mobile IP re-registrations, which are defined in the IETF Standards RFC 3012 and RFC 3344. In a typical mobile IP re-registration, a mobile node (MN) generates a Registration Request (RRQ) when the mobile node moves from one access network to another. The originating access network is represented by a Foreign Agent (FA), which forwards the Registration Request to the mobile node's Home Agent (HA) located in the Core Serving Network (CSN). The Registration Request message therefore provides a binding between the mobile node, the foreign agent, and the home agent that can be used to deliver user traffic to the mobile node while the mobile node is in motion.

Unauthorized or fraudulent mobile nodes may attempt to gain access to the wireless communication system by establishing a false binding between the unauthorized mobile node, a foreign agent, and a home agent associated with an authorized mobile node. In order to avoid false bindings requested by unauthorized mobile nodes, each Resource Request contains an authentication signature that can be used to authenticate an existing security association between the authorized mobile node and the home agent. This signature is typically included in a portion of the Resource Request message that may be referred to as the MN-HA Authentication Extension (MN-HA-AE) of the RRQ message. The MN-HA-AE is computed according to the RFC 3344 using a secret key established between the authorized mobile node and the home agent. This secret key is typically referred to as the MN-HA key.

Each home agent may store numerous MN-HA keys associated with different mobile nodes. Accordingly, the authentication extension MN-HA-AE can include an index, known as the Security Parameter Index (SPI), which indicates the particular instance of the MN-HA key that should be used to authenticate the security association between the mobile node and the home agent. When the home agent receives a resource request message, the home agent extracts the SPI from the authentication extension MN-HA-AE. The home agent then checks the SPI value against its database of active security associations for the mobile node. If the home agent finds the extracted SPI value in the database of active security associations, the home agent uses the associated MN-HA key to validate the authentication extension MN-HA-AE. However, the database may not include the SPI that was transmitted in the authentication extension. The home agent may therefore request the MN-HA key from an Authentication, Authorization, and Accounting (AAA) server associated with the mobile node if the home agent is unable to locate the SPI in the database of active security associations. The home agent may record the key received from the AAA server alongside the SPI in the database of security associations and use the key to validate the authentication extension MN-HA-AE.

Existing standards do not define consistent procedures for provisioning the keys that are used in the authentication extension MN-HA-AE. In CDMA2000® High Rate Packet Data (HRPD) networks, the MN-HA keys are pre-provisioned and do not change for the lifetime of the mobile node. In other networks, the MN-HA keys can be determined using other pre-provisioned keys and pre-defined secure algorithms. In WiMAX systems, the MN-HA keys are determined by bootstrapping from an active access security association, which is established using Extensible Authentication Protocol (EAP) transactions. For example, the Enhanced Master Session Key (EMSK) can be generated as the result of a successful EAP authentication. The EMSK is used as the secret seed to create a Mobile IP Root Key (MIP-RK) and the MIP-RK is used to create the hierarchy of necessary Mobile IP security associations for Mobile IP, including MN-HA key. This key hierarchy is shown in FIG. 5.2 of the WiMAX Stage 3 Description (this figure is reproduced herein as FIG. 1). If the mobile node does not support the Mobile IP protocol, and the access network may act as a proxy Mobile IP client or proxy Mobile IP node. In this case, a PMN-HA key may be generated for the proxy client or node using the EMSK. A new EMSK is generated when a mobile node traverses a boundary between two un-trusted access networks and so a new set of Mobile IP keys, including the MN-HA and PMN-HA keys, is created.

Since the MN-HA and PMN-HA keys are not provisioned in a consistent manner, each home agent may have a more than one MN-HA and/or PMN-HA key for each of the mobile nodes. Consequently, it may be difficult for the home agent to determine whether it has the correct MN-HA or PMN-HA key for validating the authentication extension transmitted by a mobile unit or whether it should request a new MN-HA or PMN-HA key from the AAA server. The home agent may also have difficulty determining which key is being requested by the authentication extension, particularly if the database of active security associations for the mobile node indicates that multiple MN-HA or PMN-HA keys have been established for different security associations in different types of network. These problems are exacerbated by the fact that existing standards do not define procedures for selecting SPI values for the MN-HA or PMN-HA keys. For example, the same SPI values may be generated for different MN-HA or PMN-HA keys, leading to collisions when the corresponding mobile nodes transmit authentication extensions.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided involving a mobile node, a home agent, and an authentication server in a wireless communication system. The method includes generating, at the authentication server, a first security key that indicates a secure association between the home agent and the mobile node based on a second security key that indicates a secure association between the mobile node and the authentication server. The method also includes generating, at the authentication server, at least one first index associated with the first security key. The first index is also generated by the mobile node. The method also includes storing, at the authentication server, the first index and the first security key.

In another embodiment of the present invention, a method is provided involving a mobile node, a home agent, and an authentication server in a wireless communication system. The method includes generating, at the mobile node, a first security key that indicates a secure association between the home agent and the mobile node. The first security key is generated based on a second security key that indicates a secure association between the mobile node and the authentication server. The method also includes generating, at the mobile node, at least one first index associated with the first security key. The first index is also generated by the authentication server. The method further includes storing, at the mobile node, the first index and the first security key.

In yet another embodiment of the present invention, a method is provided involving a mobile node, a home agent, and an authentication server in a wireless communication system. The method includes accessing, at the home agent, a first security key that indicates a secure association between the home agent and the mobile node. The first security key is generated based on a second security key that indicates a secure association between the mobile node and the authentication server. The first security key is accessed based on at least one first index associated with the first security key. The first index is generated by the authentication server and the mobile node. The method further includes validating, at the home agent, a second security key provided by the mobile node using at least one second index provided by the mobile node.

BRIEF DESCRIPTION OF THE DRAWINGS

The invention may be understood by reference to the following description taken in conjunction with the accompanying drawings, in which like reference numerals identify like elements, and in which.

Figure 1:
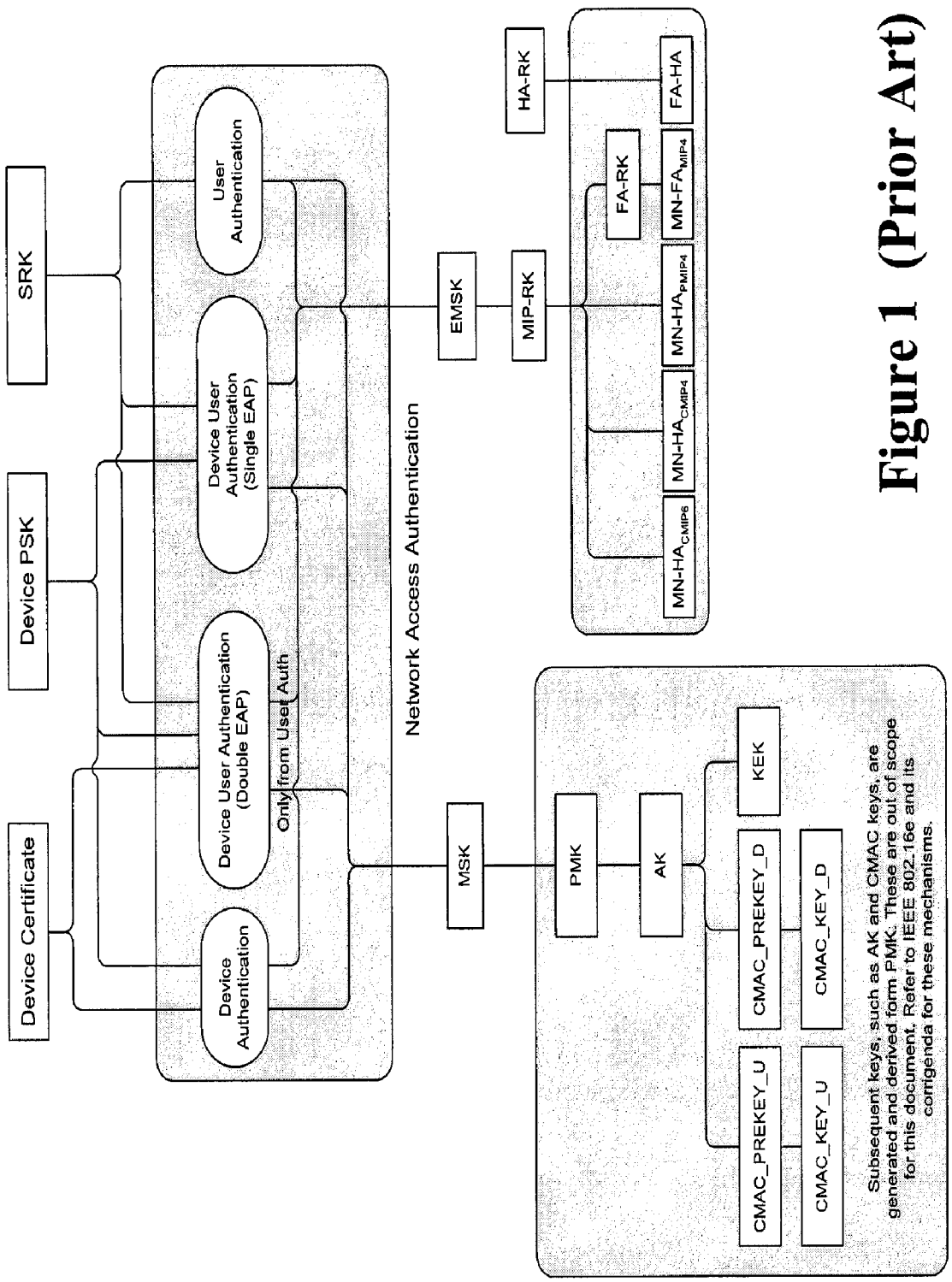
FIG. 1 shows one exemplary embodiment of a conventional security key hierarchy.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2:
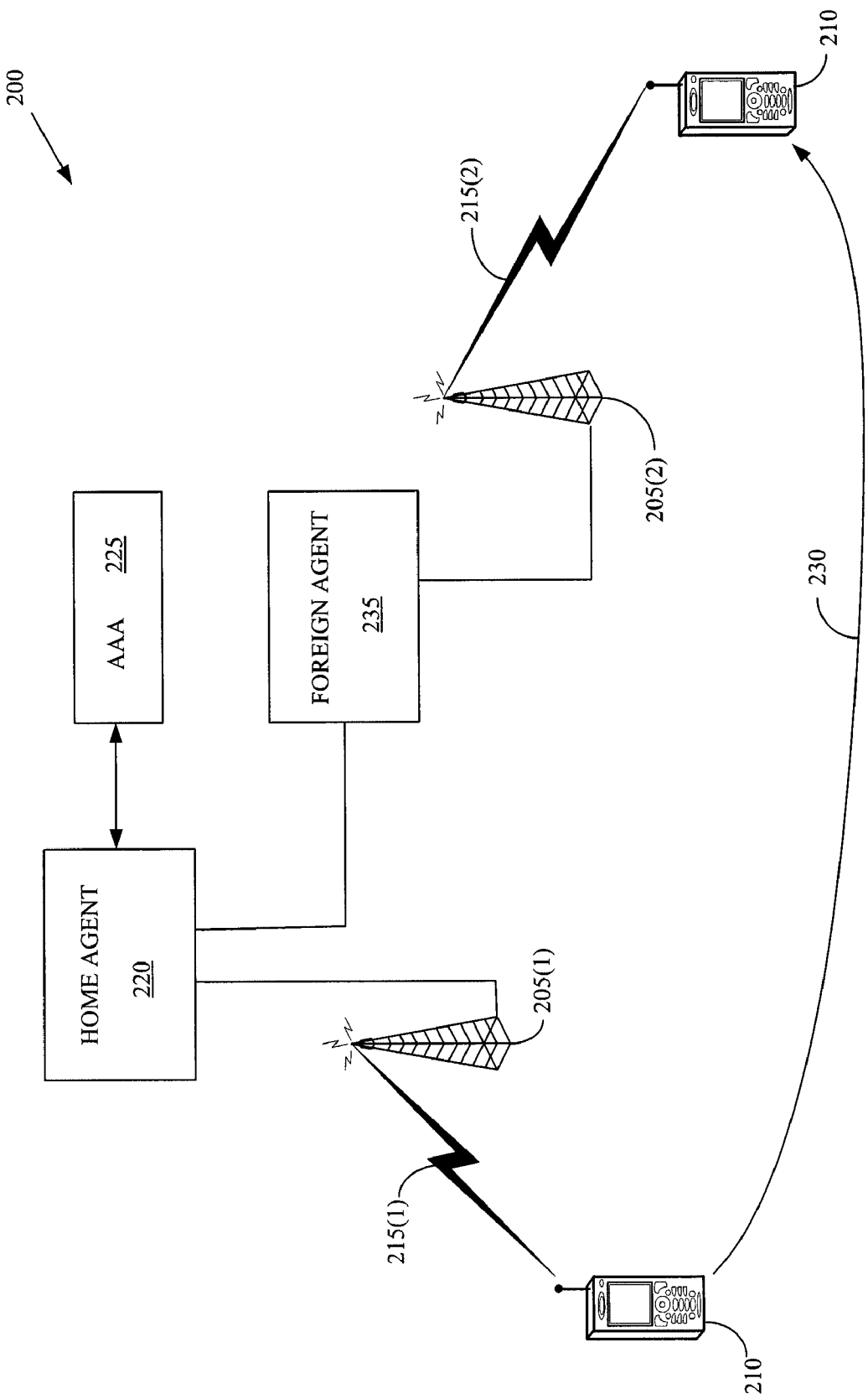
FIG. 2 conceptually illustrates one exemplary embodiment of a wireless communications system, in accordance with the present invention.

FIG. 2 conceptually illustrates one exemplary embodiment of a wireless communications system 200. In the illustrated embodiment, the wireless communications system 200 may provide wireless connectivity according to third generation wireless communication protocols such as described in the IEEE 802.16 broadband wireless system supported by network procedures specified by the WiMAX Forum. However, persons of ordinary skill in the art should appreciate that the present invention is not limited to a wireless communications system 200 that operates according to the IEEE 802.16 system. In alternative embodiment, any wireless communication protocol may be used to provide wireless connectivity. Furthermore, in some embodiments, the wireless communications system 200 may include, or be connected to, one or more wired communication systems.

The wireless communications system 200 shown in FIG. 2 may include one or more base stations 205(1-2). In the interest of clarity, the indices (1-2) will hereinafter be dropped when the base stations 205 are being referred to collectively. However, the indices (1-2) may be used when referring to the base stations 205 individually or to a subset of the base stations 205. The same convention will be used with regard to other indices that distinguish between components that share an identifying numeral. Although two base stations 205 are shown in FIG. 2, persons of ordinary skill in the art should appreciate that the present invention is not limited to wireless communication systems 200 including only two base stations 205. In alternative embodiments, any number of base stations 205 may be deployed in the wireless communication system 200. In the illustrated embodiment, the base stations 205 may provide wireless connectivity using orthogonal frequency division multiplexing (OFDM/OFDMA) techniques. However, persons of ordinary skill in the art should appreciate that the present invention is not limited to the use of orthogonal frequency division multiplexing techniques.

The base stations 205 may provide wireless connectivity to a mobile unit 210. In the interest of clarity, a single mobile unit 210 is depicted in FIG. 2. However, persons of ordinary skill in the art having benefit of the present disclosure should appreciate that the present invention is not limited to a single mobile unit 210 and in alternative embodiments any number of mobile units 210 may be deployed in the wireless communication system 200. The mobile unit 210 may be any type of mobile unit including, but not limited to, a cellular telephone, a personal data assistant, and a laptop computer. However, persons of ordinary skill in the art having benefit of the present disclosure should appreciate that the present invention is not limited to these particular examples of mobile units 210 and in alternative embodiments other types of mobile units 210 may also be used. Persons of ordinary skill in the art should also appreciate that the mobile units 210 may be referred to using other terms such as mobile shell, user equipment, user terminal, access terminal, subscriber station, subscriber terminal, and the like. Furthermore, persons of ordinary skill in the art having benefit of the present disclosure should appreciate that the present invention is not limited to wireless connectivity provided by base stations 205. In alternative embodiments, wireless connectivity may also be provided by access points, access networks, base station routers, and the like.

In the illustrated embodiment, the mobile unit 210 has an established security association with the base station 205(1) that permits secure transmissions over an air interface 215(1). For example, the security association may be formed according to an extensible authentication protocol (EAP), which is an authentication protocol that provides an infrastructure to enables clients to authenticate with a central authentication server. During the initial authentication, an EAP authentication may be executed between the mobile unit 210, a home agent 220, and an Authentication, Authorization, and Accounting server (AAA) 225 that handles various functions associated with authenticating and authorizing wireless communications, as well as providing billing services associated with a wireless communications. Techniques for performing the initial EAP authentication are known in the art and in the interest of clarity only those aspects of authenticating and authorizing wireless communications that are relevant to the present invention will be discussed herein. The home agent 220 may be included in a core serving network (not shown in FIG. 2).

If the initial EAP authentication is successful, a Master Session Key (MSK) and an Extensible Master Session Key (EMSK) are derived by the AAA 225 and the mobile unit 210. The MSK and/or EMSK signify the security association between the mobile unit 210 and the AAA 225. The mobile unit 210 and the AAA 225 may then derive other keys using the MSK and/or the EMSK. In one embodiment, the mobile unit 210 and the AAA 225 may each derive keys that may be used to establish a security association between the mobile unit 210 and the home agent 220. For example, the mobile unit 210 and the AAA 225 may each derive copies of a MN-HA key according to procedures defined by the Mobile IP (MIP) standards and/or protocols. Alternatively, if the mobile unit 210 is not configured to operate according to the Mobile IP standards and/or protocols, the base station 205(1) may act as a Mobile IP proxy for the mobile unit 210. The proxy base station 205(1) and the AAA 225 may then derive proxy keys (PMN-HA) that may be used to establish the security association between the proxy base station 205(1) and the home agent 220.

The AAA 225 and the mobile unit 210 also generate indices corresponding to the security keys that are used for the secure association between the mobile unit 210 (or proxy) and the home agent 220. For example, the AAA 225 and the mobile unit 210 may derive a Security Parameter Index (SPI) for each of the security keys. In systems where the MN-HA and other Mobile IP keys are bootstrapped from another security association, such as the security associate between the mobile unit 210 (or proxy) and the AAA 225 that is represented by the EMSK derived during EAP authentication, the AAA 225 that creates these subordinate keys also generates associated values of SPI for every instance of these keys. For example, when the AAA 225 completes the EAP procedures for mobile access authentication and create the EMSK and MIP-RK, the AAA 225 also generates a corresponding index for client mobile units that implement version 4 of the MIP standards (SPI-CMIPv4), a corresponding index for client mobile units that implement version 6 of the MIP standards (SPI-CMIPv6), and corresponding indices for client mobile unit proxies that implement versions 4 and 6 of the MIP standards (SPI-PMIPv4, SPI-PMIPv6). Mobile units 210 (or their proxies) may also generate the appropriate index, depending on whether the mobile unit 210 (or proxy) operates according to version 4 or 6 of the MIP standards. In one embodiment, the SPI values may be checked to ensure that they do not collide with other active SPI values.

The mobile unit 210 may then roam to another area that is served by a different base station 205(2), as indicated by the arrow 230. The base station 205(2) may be part of a different access network (not shown in FIG. 2). To establish a secure service binding between the mobile unit 210, foreign agent 235, and the home agent 220, the mobile unit 210 transmits a resource request message over the air interface 215(2) to the home agent 220 via the foreign agent 235. The resource request message includes information indicating the value of the MN-HA security key held by the mobile unit 210 and the index associated with the security key. For example, the mobile unit 210 may transmit a resource request message that includes an authentication extension (e.g., an MN-HA-AE) that includes the security key information and the corresponding index.

The home agent 220 can then determine whether the mobile unit 210 is an authorized mobile node. In one embodiment, the home agent 220 may check the provided value of the index against the list of active index values for the mobile unit 210. If the provided value of the index is found in the list of active index values for the mobile unit 210, the home agent 220 may access the value of the security key associated with the provided value of the index, e.g., from a database including the index values and the associated security keys. If the provided value of the index is not found in the list of active index values for the mobile unit 210, the home agent 220 may request the associated security keys (e.g., the MN-HA or PMN-HA keys) from the AAA 225. The AAA 225 may check the value of the provided index against the list of active index values for the mobile unit 210, and return the MN-HA (or PMN-HA) key associated with the index provided in the request from the mobile unit 210. The home agent 220 may then use the security key associated with the provided index to validate the MN-HA-AE, thus completing the Mobile IP service binding for the mobile unit 210, the foreign agent 235, and the home agent 220.

Figure 3:
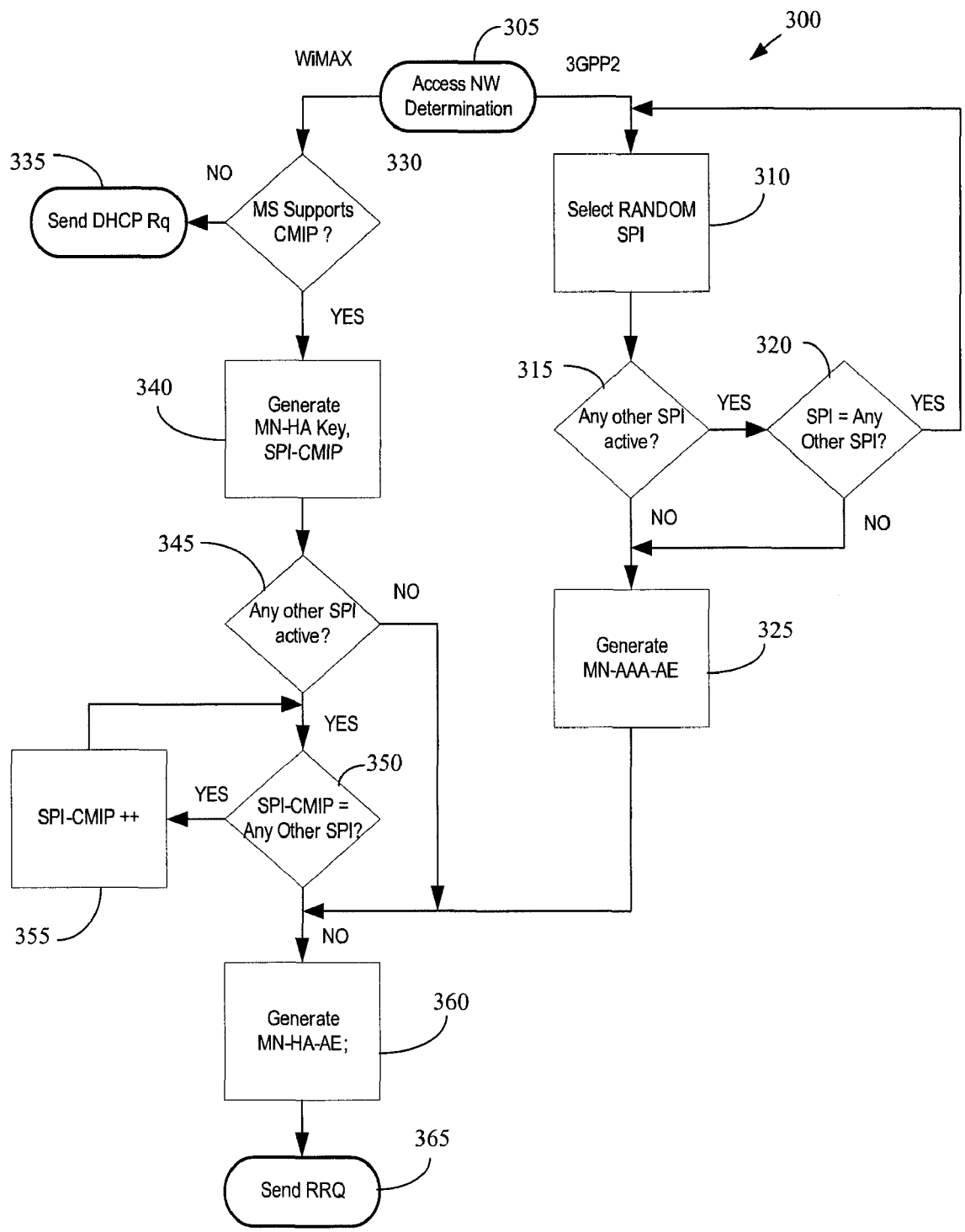
FIG. 3 conceptually illustrates a first exemplary embodiment of a method of generating mobile node-home access keys and associated indices, in accordance with the present invention.

FIG. 3 conceptually illustrates a first exemplary embodiment of a method 300 of generating mobile node-home access keys and associated indices. In the illustrated embodiment, the system first determines (at 305) what type of network the mobile node is attempting to access. If the mobile node is attempting to access a network that operates according to the 3GPP2 standards and/or protocols, then the mobile node and the associated authentication server select (at 310) a random number as the Security Parameter Index (SPI) that is associated with the MN-HA key that is generated for the mobile node and the associated home agent. The mobile node and the authentication server both determine (at 315) whether there are any other active SPI values associated with the mobile node's sessions. If other active sessions are present and have SPI values, then the mobile node and the authentication server determine (at 320) whether the currently selected value of the SPI is the same as (i.e., collides with) one of the existing SPI values. If so, then another random value of the SPI is selected (at 310). Once a unique value of the SPI has been selected (at 310), then the mobile node generates (at 325) an authentication extension (MN-AAA-AE) that can be included in a resource request message transmitted (at 365) to the home agent.

If the mobile node is attempting to access a network that operates according to the WiMAX standards and/or protocols, then the system determines (at 330) whether the mobile node supports client Mobile IP (CMIP) standards and protocols. If the mobile node does not support CMIP, then a dynamic host control protocol (DHCP) request is sent (at 335). If the mobile node does support CMIP, then the mobile node and the authentication server generate (at 340) a MN-HA key and then associated index, such as an SPI value. For example, when an AAA server completes the EAP procedures for Mobile Access Authentication and creates the EMSK and MIP-RK, it also generates the SPI-CMIPv4, SPI-CMIPv6, SPI-PMIPv4, and SPI-PMIPv6 values. These 4-octet values may be generated from the EMSK or MIP-RK by using a pseudo-random function, such as the HMAC-SHA1 function. The SPI-CMIPv4 value can be associated with MN-HA key used by the Mobile IP v.4 Client MN (CMIPv4 MN), the SPI-CMIPv6 can be associated with MN-HA key used for MIPv6, the SPI-PMIPv4 can be associated with PMN-HA key used by the Proxy Mobile IP v4 MN (PMIPv4 MN), and SPI-PMIPv6 can be associated with PMN-HA key used for PMIPv6 MN. Values of SPI-CMIPv4 and SPI-CMIPv6 can be generated at the mobile node and the authentication server because both of them have the EMSK and/or MIP-RK. No other network entities need this value before an initial access.

One possible way to generate values for SPI-CMIP and SPI-PMIP is to split the output of the pseudo-random function of the EMSK according to the equation:

$$SPI\text{-}CMIPv4|SPI\text{-}CMIPv6|SPI\text{-}PMIPv4|SPI\text{-}PMIPv6 = prf(EMSK|\text{``}\ldots\text{''})$$

Alternatively, the output of the pseudo-random function of the MIP_RK could be split according to the equation:

$$SPI\text{-}CMIPv4|SPI\text{-}CMIPv6|SPI\text{-}PMIPv4|SPI\text{-}PMIPv6 = prf(MIP\text{-}RK|\text{``}\ldots\text{''})$$

When the resulting values are split in four as indicated above, the 32 Least Significant bits represent SPI-CMIPv4, next 32 bits represent SPI-CMIPv6, etc. Another method of generating values for SPI-CMIP and SPI-PMIP is to use the 4 Least Significant Bytes of the result as the value of SPI-CMIPv4 and then increment this value to form the other SPI values as indicated in the following equations:

$$SPI\text{-}CMIPv4 = prf(MIP\text{-}RK | \text{``}\ldots\text{''}), 32$$

$$SPI\text{-}PMIPv4 = SPI\text{-}CMIPv4 + 1$$

$$SPI\text{-}CMIPv6 = SPI\text{-}PMIPv4 + 1$$

$$SPI\text{-}PMIPv6 = SPI\text{-}CMIPv6 + 1$$

This approach creates a "SPI Zone" containing four adjacent values of SPI associated with the same MIP-RK key. Persons of ordinary skill in the art having benefit of the present disclosure should appreciate that these techniques for generating the SPI values are illustrative and are not intended to limit the present invention.

The mobile node and the authentication server then determine (at 345) whether the mobile node has any other active sessions having associated SPI values. If other active sessions are present and have SPI values, then the mobile node and the authentication server determine (at 350) whether the currently selected value of the SPI is the same as (i.e., collides with) one of the existing SPI values. If so, then the value of the SPI is incremented (at 355) and the incremented value is tested (at 350) to determine whether it collides with another existing SPI value. Once a unique value of the SPI has been found, then the mobile node generates (at 360) an authentication extension (MN-AAA-AE) that can be included in a resource request message transmitted (at 365) to the home agent.

In one embodiment, the home agent may check the SPI against the list of active SPI values for this mobile node, and if necessary, may request the associated MN-HA (or PMN-HA) key from the AAA server. If the home agent requests the SPI, the AAA server may check the SPI against the list of active SPI values for this mobile node, and return the MN-HA (or PMN-HA) key associated with the SPI in the request. The HA can then use the received MN-HA (or PMN-HA) key to validate the MN-HA-AE, thus completing Mobile IP service binding. In one embodiment, values of SPI-PMIPv4 and SPI-PMIPv6 generated at the AAA may be sent to the associated access serving network (ASN) in the last RADIUS Access Accept message that carries the last EAP Success transaction. The ASN may buffer the SPI-PMIPv4 and SPI-PMIPv6 for use with associated PMN-HA key, when the PMN-HA-AE is generated for the RRQ message.

Figure 4:
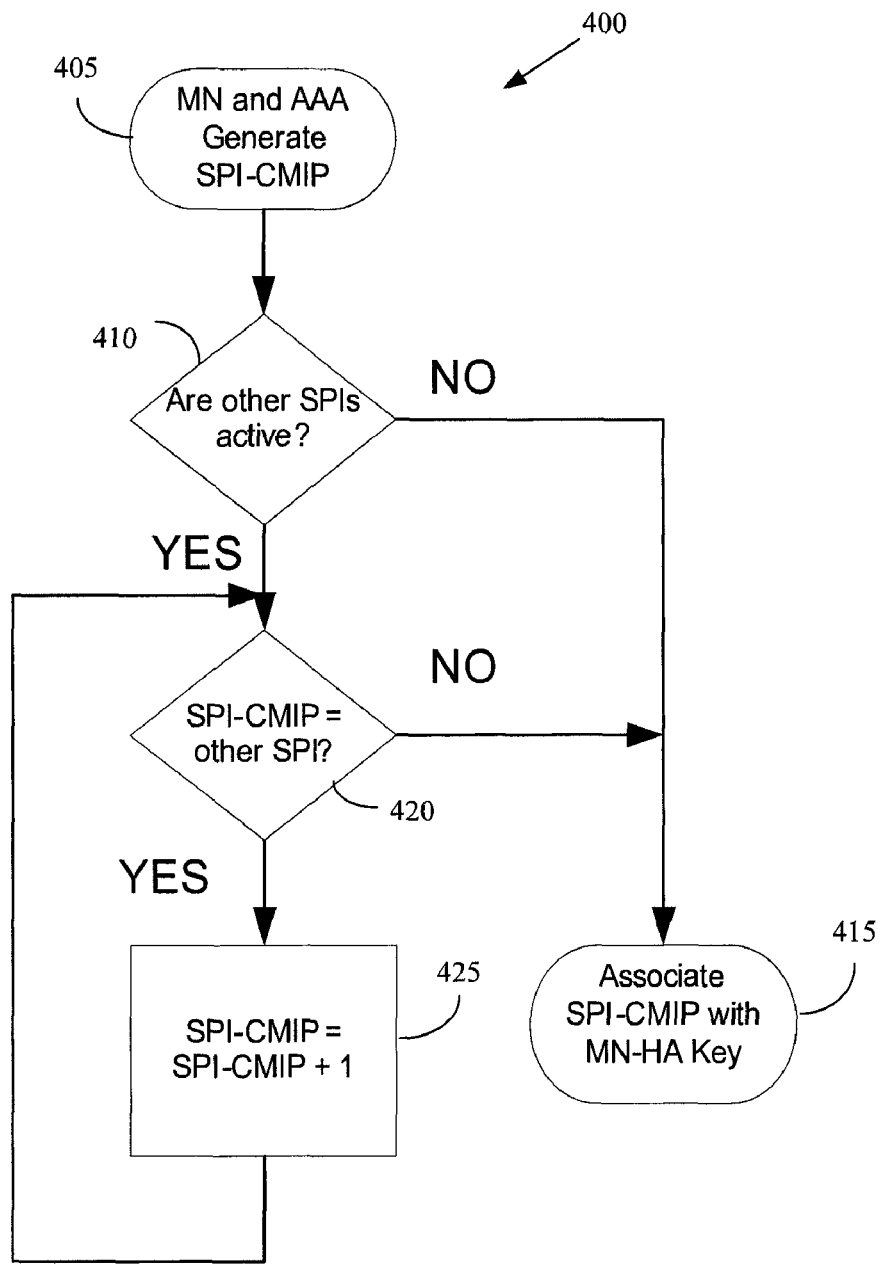
FIG. 4 conceptually illustrates a second exemplary embodiment of a method of generating mobile node-home access keys and associated indices, in accordance with the present invention.

FIG. 4 conceptually illustrates a second exemplary embodiment of a method 400 of generating mobile node-home access keys and associated indices. In the illustrated embodiment, a mobile node (MN) and an authentication server (AAA) generate (at 405) copies of an index according to the client MIP standards and/or protocols. The mobile node and the authentication server then check (at 410) whether other indices associated with the mobile node and the authentication server are currently active. If no other indices are active, then the index is associated (at 415) with a security key, such as a MN-HA security key that is generated by the mobile node and the authentication server, as discussed herein. If other indexes are active, then the mobile node and the authentication server determine (at 420) whether the newly selected index is equal to (i.e., collides with) another active index. If the newly selected index is not equal to any existing index, the index is associated (at 415) the MN-HA security key. However, if the newly selected index collides with an existing index, then the newly selected index is incremented by 1 (at 425) until a unique value of the newly selected index is found. The index is then associated (at 415) the MN-HA security key.

Figure 5:
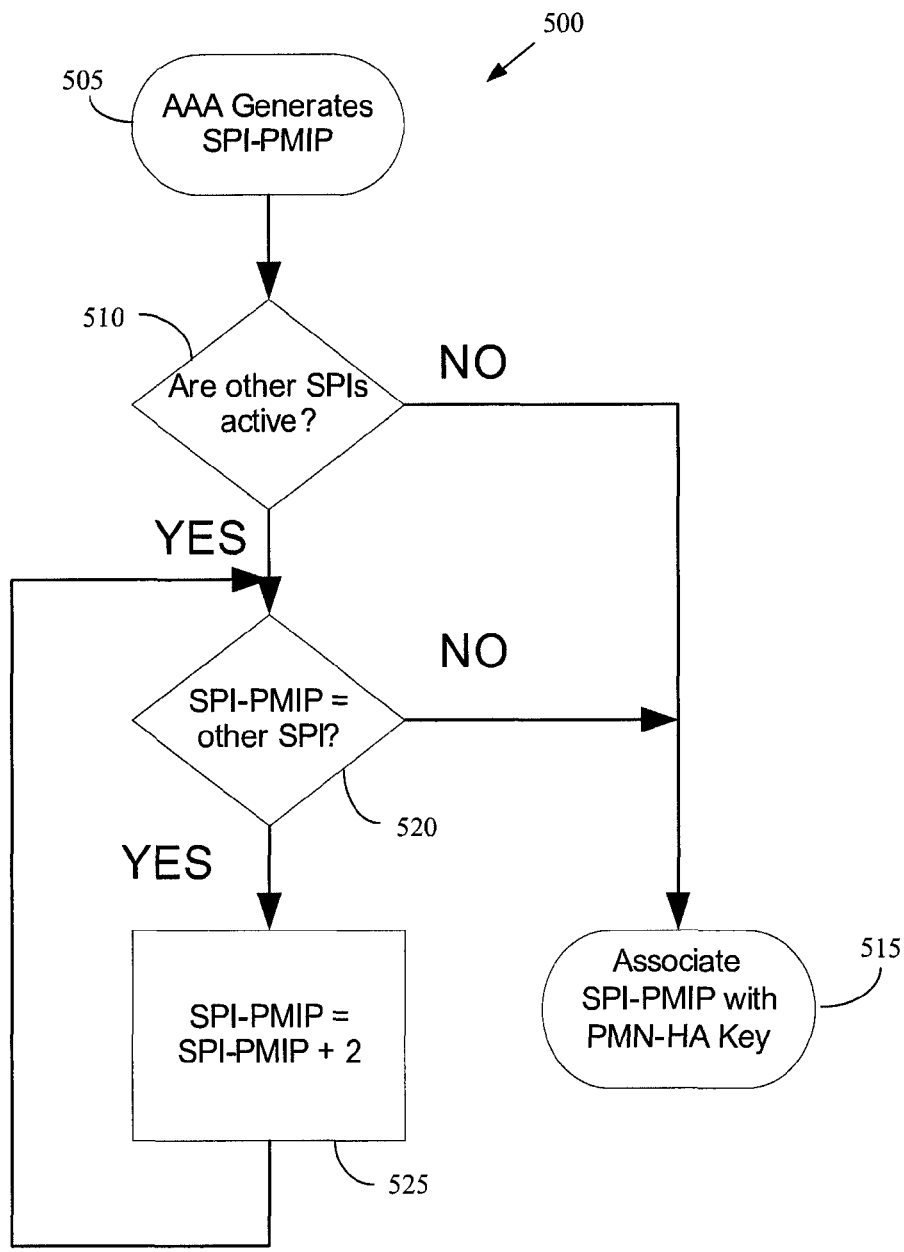
FIG. 5 conceptually illustrates a third exemplary embodiment of a method of generating mobile node-home access keys and associated indices, in accordance with the present invention.

FIG. 5 conceptually illustrates a third exemplary embodiment of a method 500 of generating mobile node-home access keys and associated indices. In the illustrated embodiment, the system includes a mobile node (MN) that does not operate according to client MIP standards and/or protocols. Accordingly, a proxy for the mobile node is defined within the system. An authentication server (AAA) generates (at 505) an index according to the proxy MIP standards and/or protocols. The authentication server then checks (at 510) whether other indices associated with the mobile node proxy are currently active. If no other proxy indices are active, then the proxy index is associated (at 515) with a security key, such as a proxy PMN-HA security key that is generated by the mobile node proxy and the authentication server, as discussed herein. If other proxy indexes are active, then the authentication server determines (at 520) whether the newly selected proxy index is equal to (i.e., collides with) another active proxy index. If the newly selected proxy index is not equal to any existing proxy index, the proxy index is associated (at 515) with the PMN-HA security key. However, if the newly selected proxy index collides with an existing proxy index, then the newly selected proxy index is incremented by 2 (at 525) until a unique value of the newly selected proxy index is found. The proxy index is then associated (at 515) with the PMN-HA security key.

Figure 6:
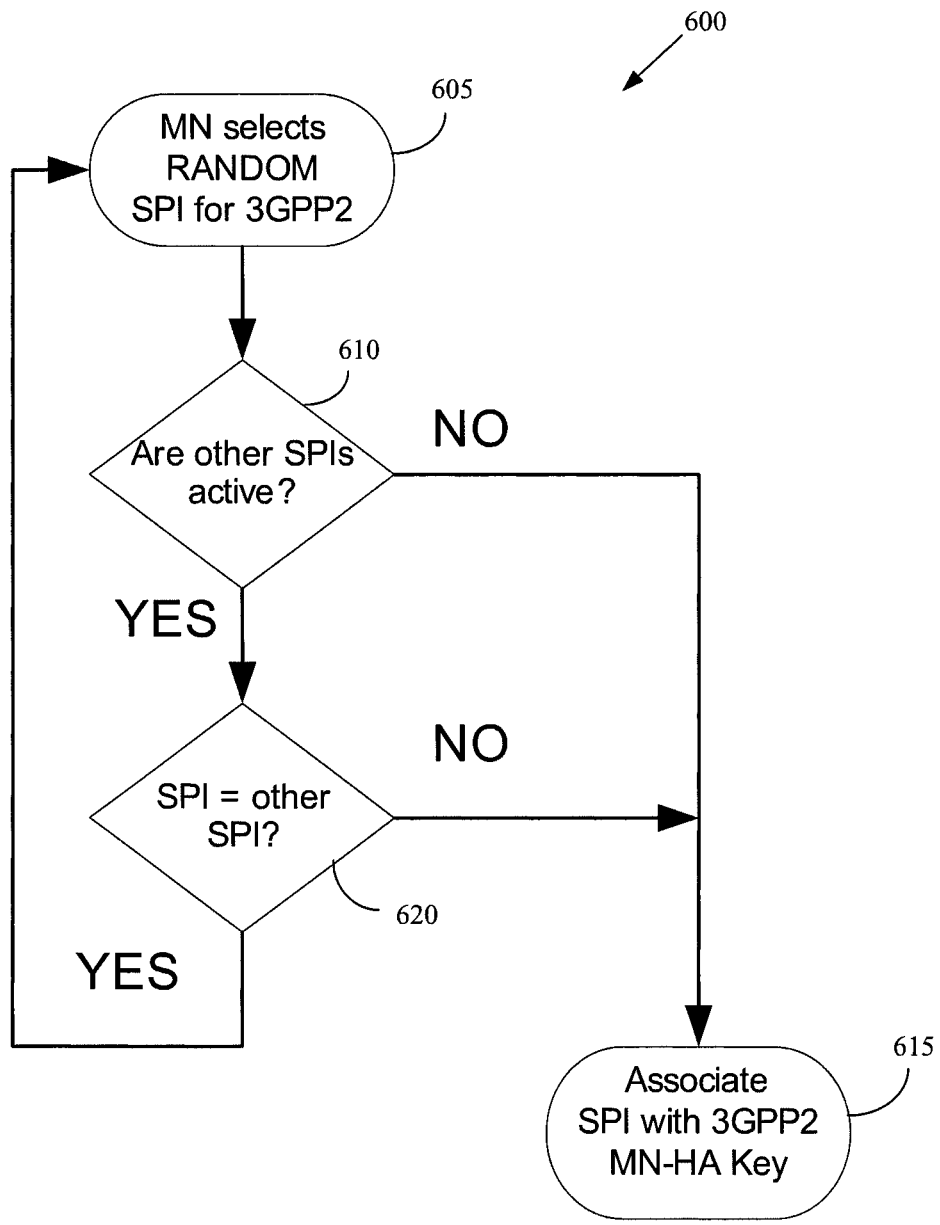
FIG. 6 conceptually illustrates a fourth exemplary embodiment of a method of generating mobile node-home access keys and associated indices, in accordance with the present invention.

FIG. 6 conceptually illustrates a fourth exemplary embodiment of a method 600 of generating mobile node-home access keys and associated indices. In the illustrated embodiment, a mobile node (MN) selects (at 605) a random number as an index according to the 3GPP2 standards and/or protocols. The mobile node then checks (at 610) whether other indices associated with the mobile node are currently active. If no other indices are active, then the index is associated (at 615) with a security key, such as a MN-HA security key that is generated by the mobile node. If other indexes are active, then the mobile node determines (at 620) whether the newly selected index is equal to (i.e., collides with) another active index. If the newly selected index is not equal to any existing index, the index is associated (at 615) the MN-HA security key. However, if the newly selected index collides with an existing index, then another random number is selected (at 605) until a unique value of the newly selected index is found. The index is then associated (at 615) the MN-HA security key.

Figure 7:
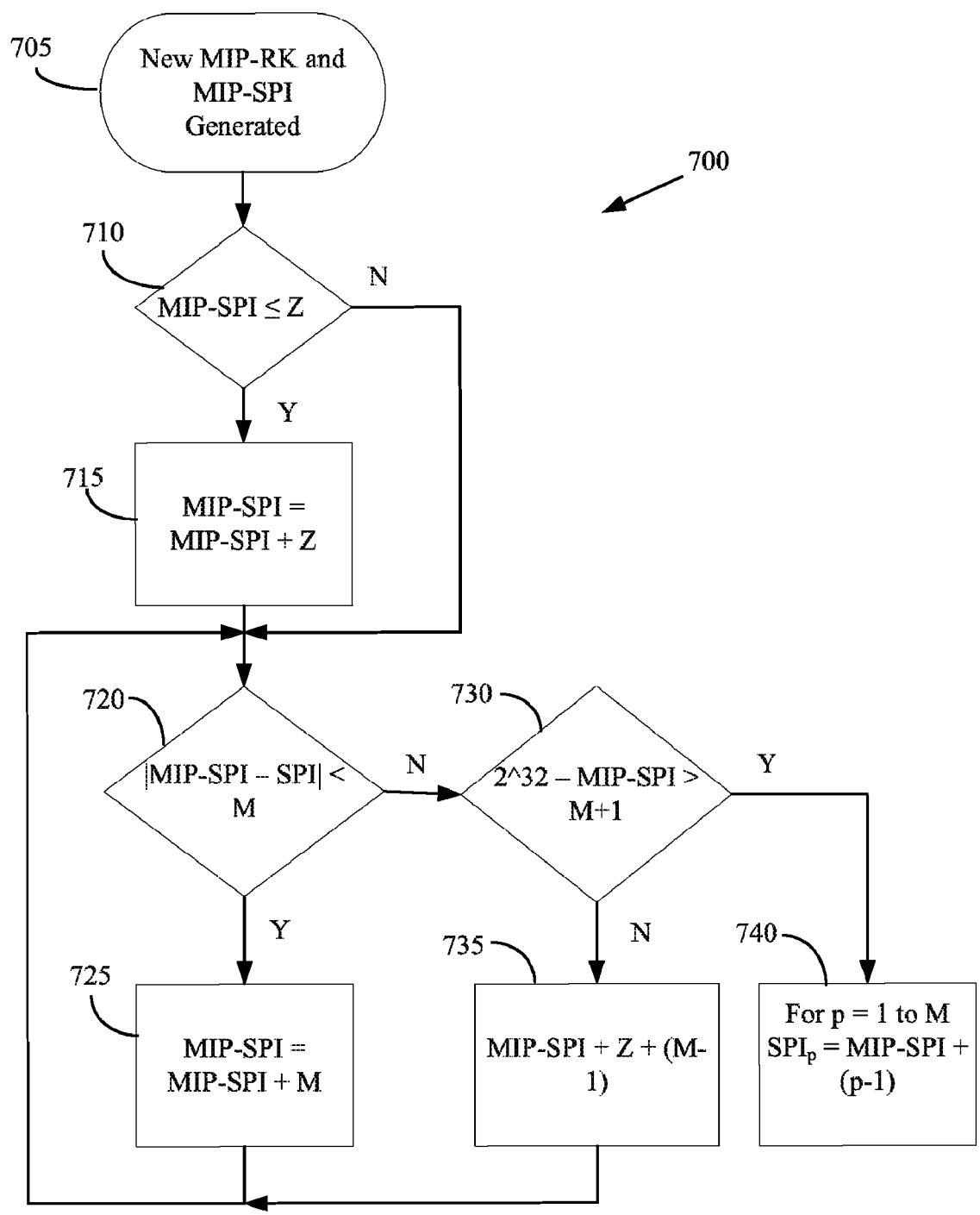
FIG. 7 conceptually illustrates a fifth exemplary embodiment of a method of generating mobile node-home access keys and associated indices, in accordance with the present invention.

FIG. 7 conceptually illustrates a fifth exemplary embodiment of a method 700 of generating a variable number of mobile node-home access keys and associated indices. The fifth exemplary embodiment may be considered a generalized example of the sixth embodiment depicted in FIG. 8. In the illustrated embodiment, a Mobile IP Root Key (MIP-RK) and a MIP-Security Parameter Index (MIP-SPI) are generated (at 705). The parameter M is used to indicate the number of SPI values that need to be computed. The value of the MIP-SPI is then checked (at 710) and if the MIP-SPI value is in a prohibited zone indicated by a reserved range of value extending from 0-Z, then the value of MIP-SPI may be increased by Z (at 715) so that it does not collide with reserved values.

In order to prevent potential collisions between values of SPI generated using this procedure, the following procedure may be implemented to prevent collision between SPI values used for different Mobility keys, for example, mobility keys used by other access technologies, during the same Mobile IP session. The value of the MIP-SPI may be compared (at 720) to values of other active SPI. If the absolute value of the difference between the MIP-SPI and any currently active SPI is less than M, the MIP-SPI value may be incremented by M (at 725) until the absolute value of the difference between the MIP-SPI and any currently active SPI is greater than or equal to M. The value of the MIP-SPI may be compared (at 730) to the maximum possible value of SPI ($2^{32}-1$). If the difference between the maximum possible value of SPI ($2^{32}-1$) and the MIP-SPI value is less than or equal to M+1, indicating that some of the SPI values may exceed the maximum allowed value, the MIP-SPI value may be incremented (at 735) by Z+M−1. The steps may be iterated until the conditions specified at 720 and at 730 are satisfied.

Once the conditions specified at 720 and at 730 are satisfied so that all collisions with any active SPI values related to current MIP session are avoided, a new set of values SPI(1-M) associated with the MIP-RK may be created (at 740) for this MIP session, as follows:

$$SPI(1) = MIP - SPI$$
$$SPI(2) = MIP - SPI + 1$$
$$\vdots$$
$$SPI(M) = MIP - SPI + M - 1$$

Figure 8:
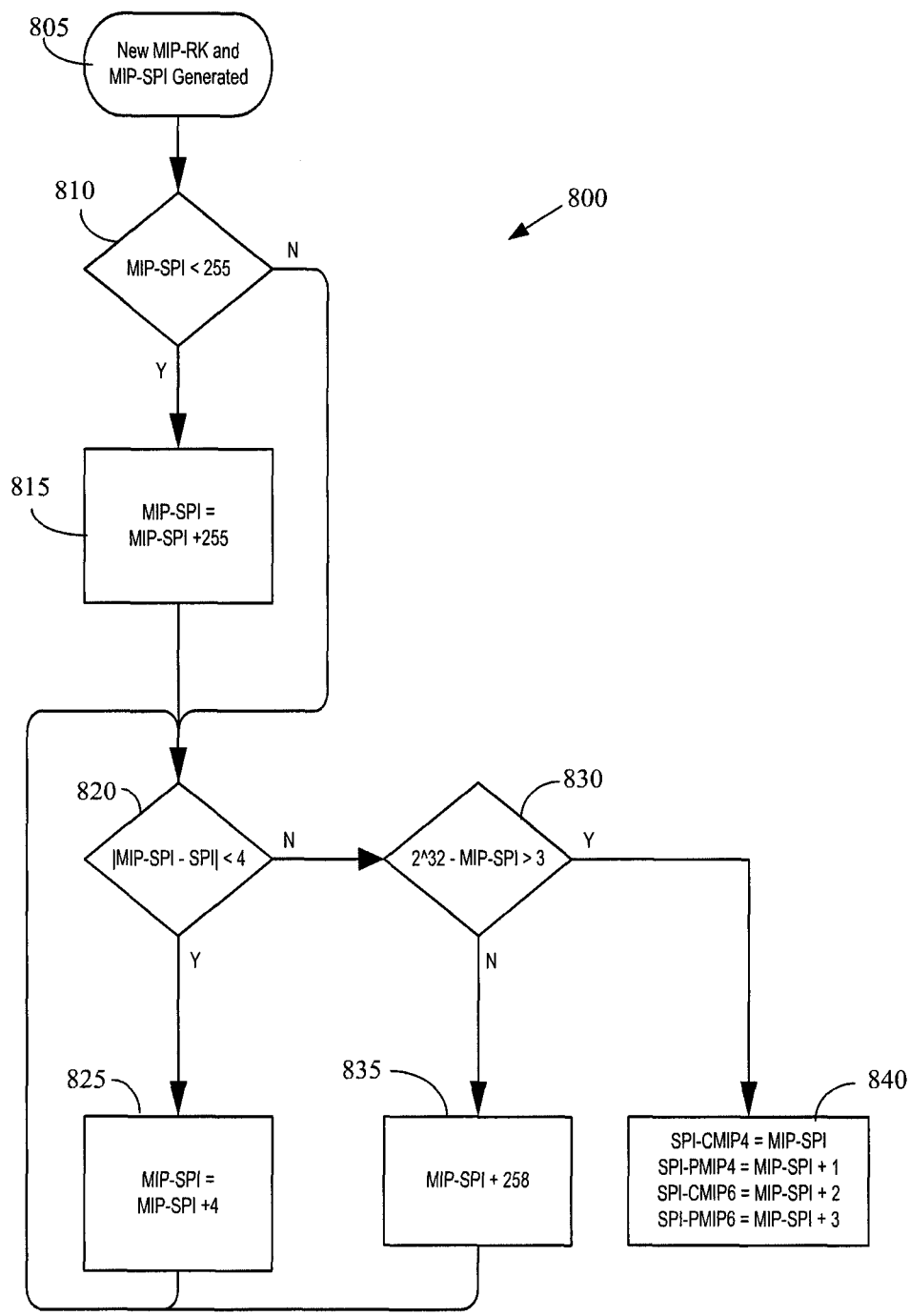
FIG. 8 conceptually illustrates a sixth exemplary embodiment of a method of generating mobile node-home access keys and associated indices.

FIG. 8 conceptually illustrates a sixth exemplary embodiment of a method 800 of generating mobile node-home access keys and associated indices. The sixth exemplary embodiment is similar to the fifth exemplary embodiment, except that the sixth exemplary embodiment corresponds to the WiMAX standards and the size of the reserved zone in the sixth exemplary embodiment is Z=255 and the number of SPI values that need to be computed is M=4. In the illustrated embodiment, a Mobile IP Root Key (MIP-RK) is generated (at 805) at the EAP-Authentication Server which is collocated with the HAAA and at the EAP-Peer located in the MS. The MIP-RK and associated Security Parameter Indices (SPI-CMIP4, SPI-CMIP6, and SPI-PMIP4) are generated (at 805) from the EMSK using the following:

$$MIP\text{-}RK=HMAC\text{-}SHA1(EMSK, \text{"MIP APPLICATION ROOT KEY"})$$

$$MIP\text{-}SPI=HMAC\text{-}SHA1(MIP\text{-}RK|\text{"SPI CMIP PMIP"})$$

In one embodiment, the 4 Most Significant Bytes of the result are be used as MIP-SPI. The value of the MIP-SPI is then checked (at 810) and if the MIP-SPI value is smaller then 255, then this value may be increased by 255 (at 815) so that it does not collide with reserved values.

In order to prevent potential collisions between values of SPI generated using this procedure, the following procedure may be implemented to prevent collision between SPI values used for different Mobility keys, for example, mobility keys used by other access technologies, during the same Mobile IP session. The value of the MIP-SPI may be compared (at 820) to values of other active SPI. If the absolute value of the difference between the MIP-SPI and any currently active SPI is less than 4, the MIP-SPI value may be incremented by 4 (at 825) until the absolute value of the difference between the MIP-SPI and any currently active SPI is greater than or equal to 4. The value of the MIP-SPI may be compared (at 830) to the maximum possible value of SPI ($2^{32}-1$). If the MIP-SPI value is less than 3 smaller than the maximum possible value of SPI ($2^{32}-1$), the MIP-SPI value may be incremented by 258 (at 835). The steps may be iterated until the conditions specified at 820 and at 830 are satisfied.

Once the conditions specified at 820 and at 830 are satisfied so that all collisions with any active SPI values related to current MIP session are avoided, a new set of SPI values associated with the MIP-RK may be created (at 840) for this MIP session, as follows:

$$SPI\text{-}CMIP4=MIP\text{-}SPI$$

$$SPI\text{-}PMIP4=MIP\text{-}SPI+1$$

$$SPI\text{-}CMIP6=MIP\text{-}SPI+2$$

In one embodiment, the value of MIP-SPI+3 is reserved for future use as SPI-PMIP6. The lifetime of MIP-RK, SPI-CMIP4, SPI-CMIP6, and SPI-PMIP4 may be set to the lifetime of the EMSK generated at the EAP-Authentication Server. The MIP-RK, SPI-CMIP4, SPI-CMIP6 and SPI-PMIP4 may be stored in a Key Holder and a Key Generator. At the HAAA, each user session is associated with a single MIP-RK. The MIP-RK may be used to generate other application keys such as a set of mobility keys. The MIP-RK may not be transported outside the Key Holder and Key Generator and, in the case when the user session re-authenticates, a new MIP-RK may be generated and the old one may be erased. When the user session is terminated the Key Holder and Key Generator for that subscriber may be erased.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed is:

1. A method involving a mobile node, a home agent, and an authentication server in a wireless communication system, comprising:

generating, at the authentication server, a first security key that indicates a secure association between the home agent and the mobile node based on a second security key that indicates a secure association between the mobile node and the authentication server;

generating, at the authentication server, at least one first index associated with the first security key, wherein said at least one first index is also generated by the mobile node;

determining whether said at least one first index collides with any, second index currently associated with the mobile node; and storing, at the authentication server, said at least one first index and the first security key when said at least one first index does not collide with said any second index and modifying said at least one first index before storing said at least one first index and the first security key when said at least one first index collides with said any second index.

2. The method of claim 1, wherein generating said at least one first index comprises generating said at least one first index using a pseudo-random function of the second security key.

3. The method of claim 1, wherein generating said at least one first index comprises generating at least one first index associated with a client mobile node and at least one first index associated with a proxy mobile node.

4. The method of claim 3, wherein generating said at least one first index comprises generating a plurality of adjacent values of first indices associated with the client mobile node and the proxy mobile node such that the plurality of adjacent values of the first indices do not collide with said any second index currently associated with the mobile node.

5. The method of claim 1, wherein determining whether said at least one first index collides with said any second index comprises determining that said at least one first index does not collide with at least one of a reserved value of a security parameter index or a previously assigned value of the security parameter index.

6. The method of claim 1, wherein modifying said at least one first index comprises iteratively incrementing said at least one first index by a selected amount when said at least one first index collides with said at least one second index until said at least one first, index does not collide with said any second index currently associated with the mobile node.

7. The method of claim 1, comprising receiving, from the home agent, a request for the first security key, the request including information indicative of said at least one first index generated by the mobile node.

8. The method of claim 7, comprising accessing the first security key based on said at least one first index and providing the first security key to the home agent.

9. The method of claim 1, comprising providing said at least one first index to at least one access network in response to successful establishment of the secure association between the mobile node and the authentication server.

10. A method involving a mobile node, home agent, and an authentication server in a wireless communication system, comprising:
   generating, at the mobile node, a first security key that indicates a secure association between the home agent and the mobile node based on a second security key that indicates a secure association between the mobile node and the authentication server;
   generating, at the mobile node, at least one first index associated with the first security key, wherein said at least one first index is also generated by the authentication server;
   determining whether said at least one first index collides with any second index currently associated with the mobile node; and
   storing, at the mobile node, said at least one first index and the first security key when said at least one first index does not collide with said any second index currently associated with the mobile node and modifying said at least one first index before storing said at least one first index and the first security key when said at least one first index collides with said any second index.

11. The method of claim 10, wherein generating said at least one first index comprises generating said at least one first index using a pseudo-random function of the second security key.

12. The method of claim 10, wherein determining whether said at least one first index collides with said any second index comprises determining that said at least one first index does not collide with at least one of a reserved value of a security parameter index or a previously assigned value of the security parameter index.

13. The method of claim 10, wherein modifying said at least one first index comprises iteratively incrementing said at least one first index by a selected amount when said at least one first index collides with said at least one second index until said at least one first index does not collide with said any second index currently associated with the mobile node.

14. The method of claim 10, comprising providing, to the home agent, a resource request message including information indicative of said at least one first index.

15. The method of claim 14, comprising establishing a service binding between the mobile node and the home agent in response to the home agent validating the first key associated with said at least one first index.

16. A method involving a mobile node, a home agent, and an authentication server in a wireless communication system, comprising:
   accessing, at the home agent, a first security key that indicates a secure association between the home agent and the mobile node, the first security key being generated based on a second security key that indicates a secure association between the mobile node and the authentication server, the first security key being accessed based on at least one first index associated with the first security key, said at least one first index being generated by the authentication server and the mobile node, and wherein the authentication server and the mobile node have determined that said at least one first index does not collide with any second index currently associated with the mobile node; and
   validating, at the home agent, a third security key provided by the mobile node using at least one third index provided by the mobile node.

17. The method of claim 16, wherein accessing said at least one first security key comprises accessing said at least one first security key from a database stored at the home agent in response to determining that said at least one third index corresponds to an index in the database.

18. The method of claim 16, wherein accessing said at least one first security key comprises providing a request to the authentication server for said at least one first security key in response to determining that said at least one third index does not correspond to an index in the database, the request including information indicative of said at least one third index.

19. The method of claim 18, wherein accessing said at least one first security key comprises receiving information indicative of said at least one first security key in response to providing the request to the authentication server.

20. The method of claim 19, comprising storing said at least one third index and said at least one first security key at the home agent.

21. The method of claim 16, comprising receiving, from the mobile node, a resource request message including information indicative of said at least one first index and wherein accessing said at least one first security key comprises accessing said at least one first security key in response to receiving the resource request message.

22. The method of claim 21, comprising establishing a service binding between the mobile node and the home agent in response to the home agent validating the first key associated with said at least one first index.

* * * * *